United States Patent [19]
Laden et al.

[11] 3,915,250
[45] Oct. 28, 1975

[54] AUXILIARY DRIVE FOR BICYCLE

[75] Inventors: Thomas R. Laden, Woodland Hills; Norbert E. Crouse, Huntington Beach, both of Calif.

[73] Assignee: Sunward Corporation, Canaga Park, Calif.

June 16, 1973   Japan............................ 48-68025

[22] Filed: Mar. 22, 1974

[21] Appl. No.: 453,732

[52] U.S. Cl. ................................ 180/33 D; 180/34
[51] Int. Cl. ............................................ B62k 11/10
[58] Field of Search ......... 180/33 D, 33 R, 33 C, 34

[56] References Cited
UNITED STATES PATENTS
1,259,989   3/1918   Hult .............................. 180/33 R X FOREIGN PATENTS OR APPLICATIONS
28,150   8/1917   Norway............................. 180/33 D
865,048   2/1941   France.............................. 180/33 D
109,327   12/1943   Sweden................................ 180/34
1,045,287   6/1953   France.............................. 180/33 D

*Primary Examiner*—Leo Friaglia

[57] ABSTRACT

An auxiliary drive for the rear wheel of a bicycle comprises a pair of electric motors mounted one at each side of the wheel, each having a drive roller secured to the motor shaft. The drive rollers bracket the rear tire and are connected by a tension bolt above the tire which tends to pull the two motors toward each other, thereby causing the rollers to pinch the tire therebetween and provide a frictional driving force from the two drive rollers to the tire. Power is provided from an electric battery mounted on the frame of the bicycle and control is effected through a switch mounted on the bicycle handlebar.

6 Claims, 4 Drawing Figures

AUXILIARY DRIVE FOR BICYCLE

BACKGROUND OF THE INVENTION

Prior auxiliary bicycle drives which drive the bicycle through frictional engagement with the tire consist of one or more rollers which bear radially inward against the surface of the tire. Since it is a rare bicycle wheel and tire which has a truly circular external periphery, some means must be provided for allowing the drive roller to move in and out radially, while still maintaining resilient driving pressure against the tire sufficient to frictionally transmit the torque of the drive roller to the wheel. This produces a serious problem of adjustment and maintenance.

SUMMARY OF THE PRESENT INVENTION

In the present invention a pair of substantially identical electric drive motors, each having a drive roller mounted on the end of its shaft, are mounted one on each side of the rear wheel of the bicycle. The tire is pinched between the two drive rollers by a tension bar which can be adjusted to provide a spacing between the rollers that is slightly smaller than the thickness of the tire. This pinches the tire slightly between the two drive rollers and employs the pneumatic resilience of the tire itself to provide the desired frictional drive between the two rollers and the tire. Since the only force between the rollers and the tire is provided by the link between the rollers themselves, the two forces against each side of the tire are exactly equal, and therefore the frictional drive of both rollers must be the same.

Although the wheel itself may wobble in the frame, the thickness of the tire around the circumference remains substantially constant, and therefore any wobble in the wheel does not alter the frictional drive between rollers and tire.

The two electric motors are driven in parallel from a battery source secured to the bicycle frame and controller through a hand switch mounted on the handlebar of the bicycle.

DESCRIPTION OF THE PREFERRED EMBODIMENT

Figure 1:
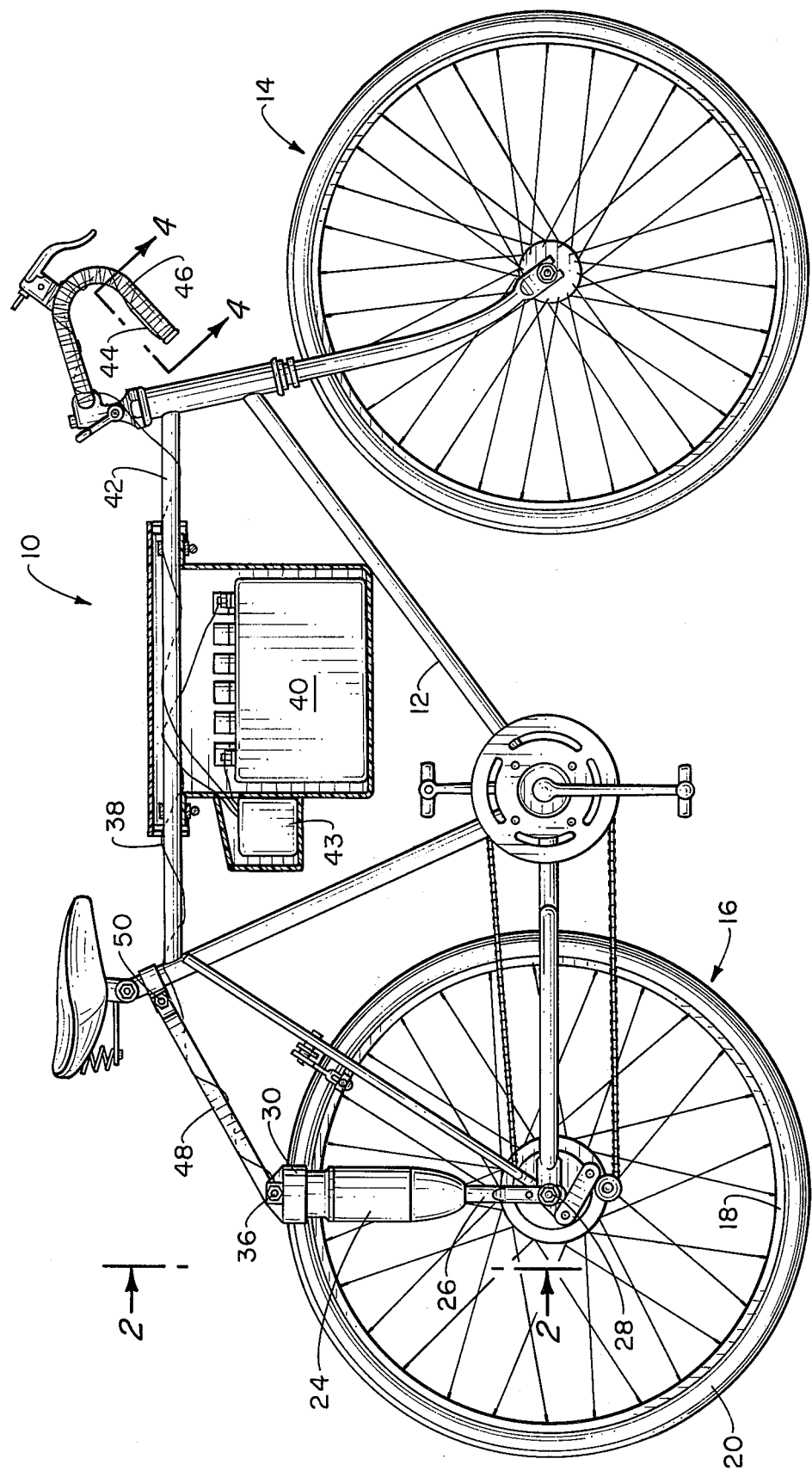
FIG. 1 is an elevation of a bicycle with the invention applied thereto.
Figure 2:
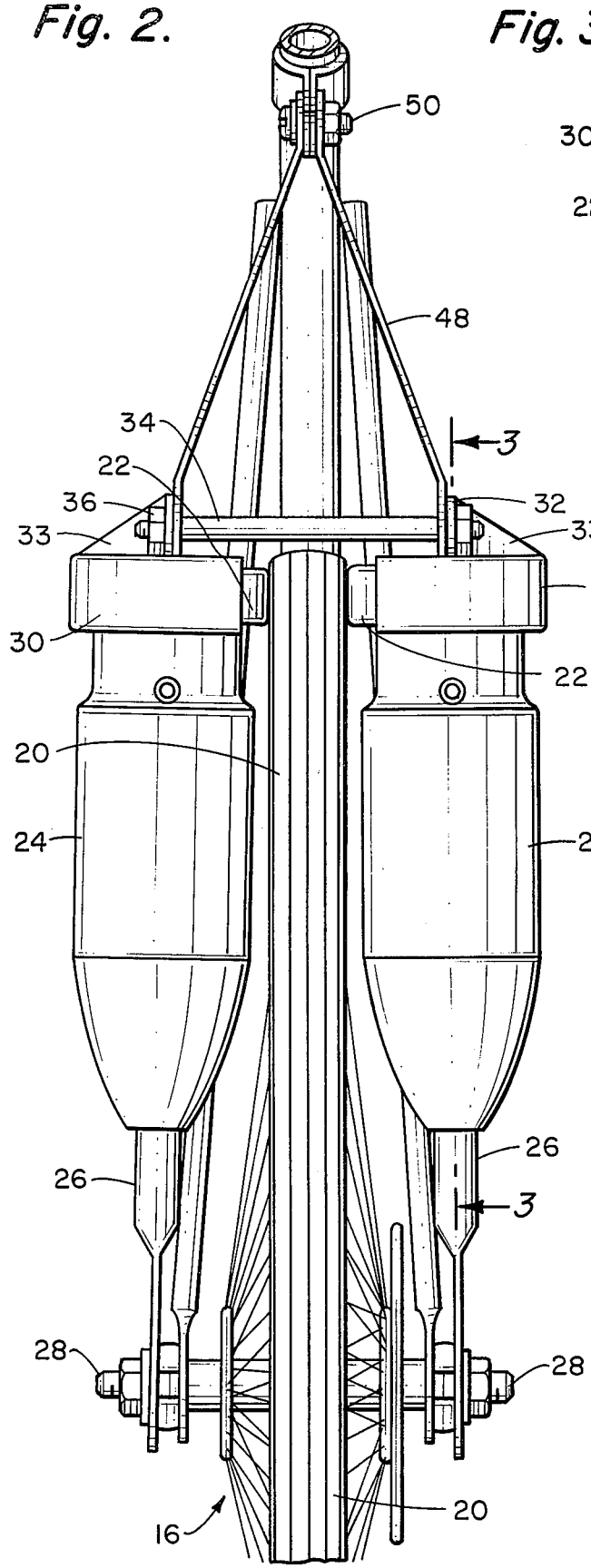
FIG. 2 is a view along line 2—2 in FIG. 1.
Figure 3:
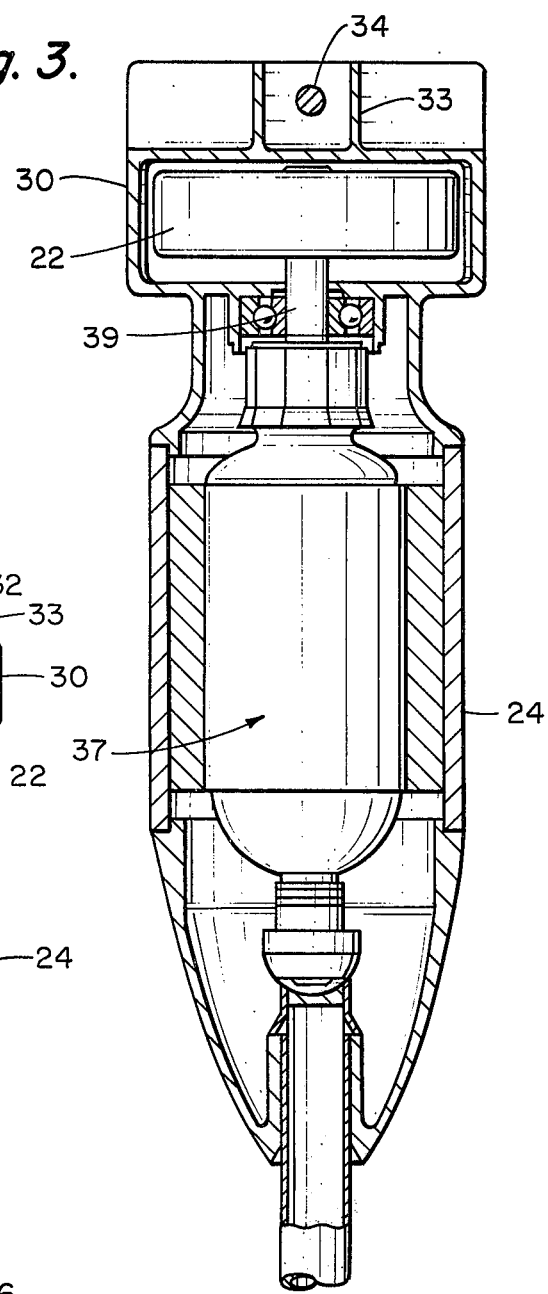
FIG. 3 is a cross-section on line 3—3 in FIG. 2.
Figure 4:
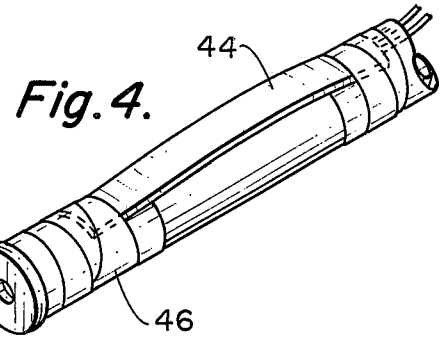
FIG. 4 is a view on line 4—4 in FIG. 1.

In the drawings 10 represents a bicycle having the usual frame 12, a front wheel assembly 14, and a rear wheel assembly 16. Each wheel assembly consists of the usual spoked wheel 18 on which is mounted a pneumatic tire 20. In accordance with the present invention, an auxiliary drive for the rear wheel assembly 16 is provided in the form of a pair of drive rollers 22 mounted on the bicycle to revolve on shafts or axes, one on each side of the wheel assembly 16, and disposed in parallel planes substantially parallel to the plane of the wheel assembly 16. As can be seen in FIG. 1, drive rollers 22 revolve on an axis which is essentially perpendicular to the axis of rotation of the wheel assembly 16. The mounting means for the rollers 22 are comprised of a respective pair of elongate motor housings 24 disposed substantially vertically, the lower ends of which have mounting bars 26 projecting therefrom. At its lower end each mounting bar 26 is mounted to the respective end of the axle 28 of the rear wheel assembly 16. This is done simply by providing a hole at the lower end of the bar 26 and passing it over the axle 28 before the axle nut is finally screwed on.

The upper end of each housing 24 is provided with a shield 30 which substantially surrounds the roller 22 and has an opening facing inwardly toward the side of the tire 20, giving access for the roller 22 to frictionally contact and drive the wheel assembly 16. Extending upwardly from each shield 30 is a ridge 32, strengthened by gussets 33. Between the ridges 32 extends a tension bolt 34 having a nut 36 threaded on each end. The screwing in of the nuts 36 draws the motor housings 24 inwardly toward each other and thus serves to pinch the tire 20 between the rollers 22 in frictional driving engagement.

Housed within each of the housings 24 is an electric motor 37, the upwardly extending shaft 39 of which has the rollers 22 secured thereto. The motors 37 are electrically connected in parallel, and power is supplied thereto through a circuit 38 which includes a battery 40 mounted to the frame 12 and suspended from the main horizontal bar 42. Control is effected through a relay 43, energized via a wafer-like leaf switch 44 which is taped flush with one of the handles 46 of the bicycle. When the switch 44 is squeezed, the relay 43 is energized and the circuit is closed, applying voltage from the battery 40 to the two motors at 24, and revolving the drive rollers 22, which drive the wheel assembly 16 in a forward direction.

Bracing means in the form of a pair of brace bars or members 48 extend forwardly from the respective ends of the tension bolt 34 and are mounted to the bicycle frame, for example by the same bolt 50 that is conventionally used to clamp the bicycle seat.

The auxiliary drive thus described may be either used as the sole motive source or may be used to boost the driving power by supplementing the pedalling of the bicycle, as for example when starting up or bicycling uphill. As soon as pressure on the switch 44 is relieved, the circuit opens and the bicycle is pedalled in a normal fashion.

If desired, nuts 36 may be wing nuts so that the rider may quickly relieve the tension in bolt 34 and thereby remove any drag which the motors 37 might apply when only pedal power is being used. Alternatively, a turnbuckle may be interposed in the bolt 34 to expedite such loosening. When appropriately designed, the motors may be driven as generators when going downhill, thereby deriving the advantages of braking and simultaneously charging the battery 40.

Whereas the present invention has been shown and described herein in what is conceived to be the best mode contemplated, it is recognized that departures may be made therefrom within the scope of the invention which is therefore not to be limited to the details disclosed herein, but is to be afforded the full scope of the invention.

The present invention may be equally well applied to the front wheel, either in lieu of or in addition to the back wheel. Furthermore, it is obviously applicable to vehicles other than bicycles, e.g. unicycles, tricycles, or other multiwheeled vehicles.

What is claimed is:

1. Auxiliary drive for a vehicle having a wheel assembly, and comprising:

a first drive roller adapted to frictionally engage one side of the wheel assembly to drive the same;

first means for mounting said first drive roller to revolve on an axis essentially perpendicular to the axis of rotation of the wheel disposed in a plane on one side of and substantially parallel to the plane of the wheel assembly;

first power means supported on said first mounting means and coupled to said first drive roller for revolving said first drive roller;

a second drive roller adapted to frictionally engage the other side of the wheel assembly directly opposite from the engagement of said first drive roller;

second means for mounting said second drive roller to revolve on an axis on the other side of the plane of the wheel assembly substantially paralleling said first roller axis;

second power means supported on said second mounting means and coupled to said second drive roller; and holding means comprising a tension member secured to and extending between said two mounting means and causing the wheel assembly to be pinched between the first and second drive rollers.

2. Auxiliary drive for a vehicle having a wheel assembly, and comprising:

a drive roller adapted to frictionally engage the side of the wheel assembly to drive the same;

first means for mounting said roller to revolve on an axis disposed in a plane substantially parallel to the plane of the wheel assembly;

holding means for holding said roller in driving engagement with the side of the wheel assembly;

first power means for revolving said roller, thereby to drive the vehicle;

a second drive roller adapted to frictionally engage the assembly at the side directly opposite from the engagement of said first-named roller;

second means for mounting said second roller to revolve on an axis substantially paralleling said first roller axis;

power means for revolving said second roller;

said holding means comprising a tension member secured to and extending between said two mounting means and causing said assembly to be pinched between said rollers;

each of said first and second mounting means comprising a respective elongated mounting member adapted to be positioned substantially vertically on respective opposite sides of the assembly;

the respective said rollers being located adjacent the upper end of said mounting members;

means adjacent the lower ends of said mounting members for mounting the same to the axle of the assembly;

said tension member being located at the upper ends of said mounting members and extending over the top of the assembly.

3. Auxiliary drive in accordance with claim 2 wherein:

each said mounting member includes a housing;

said power means includes a pair of electric motors mounted within the respective said housings and an electric battery, including means for securing same to the vehicle;

and including brace means secured to and extending from the upper ends of said housings and adapted to be secured to the vehicle frame.

4. In combination with a vehicle having a wheel with a tire thereon, an auxiliary drive comprising:

a pair of electric motors disposed one at each side of said wheel, with their shafts generally vertical, the lower ends of said motors being secured to the wheel axle;

each said motor having a roller secured to the upper end of the motor shaft, said rollers frictionally engaging opposite sides of said tire to apply driving torque thereto;

a tension bolt spanning said motors on said tire and causing said rollers to pinch said tire therebetween;

brace means extending from said tension bolt to the vehicle frame for holding said motors in position;

a battery secured to said frame;

circuit means for flowing current from said battery to said motors.

5. The combination of claim 4 wherein:

said circuit means includes a normally open leaf switch secured substantially flush to the handlebar of the vehicle.

6. Combination of claim 4 wherein:

each said motor includes a shield around a respective roller, having an opening therein through which the roller engages the tire.

* * * * *